(12) United States Patent
Yamada et al.

(10) Patent No.: US 11,619,412 B2
(45) Date of Patent: Apr. 4, 2023

(54) ENVIRONMENT CONTROL SYSTEM, AND AIR CONDITIONER OR AIR CONDITIONING SYSTEM

(71) Applicant: DAIKIN INDUSTRIES, LTD., Osaka (JP)

(72) Inventors: Eisuke Yamada, Osaka (JP); Akira Nakagawa, Osaka (JP); Kouhei Morita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/266,512

(22) PCT Filed: Dec. 27, 2019

(86) PCT No.: PCT/JP2019/051573
§ 371 (c)(1),
(2) Date: Feb. 5, 2021

(87) PCT Pub. No.: WO2020/149153
PCT Pub. Date: Jul. 23, 2020

(65) Prior Publication Data
US 2021/0310682 A1 Oct. 7, 2021

(30) Foreign Application Priority Data
Jan. 18, 2019 (JP) .............................. JP2019-006721

(51) Int. Cl.
*F24F 11/54* (2018.01)
*F24F 11/63* (2018.01)
(Continued)

(52) U.S. Cl.
CPC .............. *F24F 11/54* (2018.01); *F24F 11/38* (2018.01); *F24F 11/63* (2018.01); *F24F 11/88* (2018.01)

(58) Field of Classification Search
CPC ...... B23K 26/384; B23K 26/03; B23K 26/40; B23K 31/10; B23K 2101/001;
(Continued)

(56) References Cited

U.S. PATENT DOCUMENTS 6,459,370 B1 * 10/2002 Barrieau ................ G08B 29/06
324/522
2012/0005385 A1 * 1/2012 Hsu ..................... G06F 13/4022
710/110
(Continued)

FOREIGN PATENT DOCUMENTS

CN 108073540 A * 5/2018 .......... G06F 11/3027
JP 7-38967 A 2/1995
(Continued)

OTHER PUBLICATIONS

"Abhiemanyu Pandit, Serial Communication Protocols, Apr. 29, 2019, CircuitDigest, p. 1,https://circuitdigest.com/tutorial/serial-communication-protocols", (Year: 2019).*
(Continued)

*Primary Examiner* — Santosh R Poudel
(74) *Attorney, Agent, or Firm* — Birch, Stewart, Kolasch & Birch, LLP

(57) ABSTRACT

An environment control system includes: a control unit; a serial communication bus including a main communication line having a first end connected to the control unit and first to Nth (N: an integer of 2 or more) sub communication lines branched off from a second end of the main communication line; devices connected to the first to Nth sub communication lines; and switching units disposed on all the first to Nth sub communication lines and configured to connect and disconnect the devices to and from the control unit. Each of the first to Nth sub communication lines is connected to one or more of the devices.

7 Claims, 5 Drawing Sheets

(51) Int. Cl.
*F24F 11/38* (2018.01)
*F24F 11/88* (2018.01)

(58) Field of Classification Search
CPC .............. G05B 13/0265; G05B 13/042; G06Q 10/063112; G06Q 10/06313; G06Q 10/06316; G06Q 10/08; F01D 5/14; F05D 2220/30; F05D 2230/13; F05D 2270/3062
See application file for complete search history.

(56) References Cited

U.S. PATENT DOCUMENTS

| | | | | |
|---|---|---|---|---|
| 2013/0073761 | A1* | 3/2013 | Nierop | H04L 12/40045 |
| | | | | 710/316 |
| 2014/0281079 | A1* | 9/2014 | Biskup | G06F 11/2007 |
| | | | | 710/110 |
| 2016/0164718 | A1* | 6/2016 | Choi | H04L 41/0672 |
| | | | | 370/228 |
| 2017/0294805 | A1* | 10/2017 | Remillard | H04N 21/41265 |
| 2018/0146356 | A1* | 5/2018 | Bai | H04W 76/11 |
| 2020/0295557 | A1* | 9/2020 | Cox | H02H 7/28 |

FOREIGN PATENT DOCUMENTS

| | | | |
|---|---|---|---|
| JP | 2001-5743 A | | 1/2001 |
| JP | 2002-108637 A | | 4/2002 |
| JP | 2002-323253 A | | 11/2002 |
| JP | 2008-39344 A | | 2/2008 |
| JP | 2008-278403 A | | 11/2008 |
| KR | 20140107002 A | * | 9/2014 ............ F24F 13/222 |

OTHER PUBLICATIONS

Extended European Search Report, dated Sep. 1, 2021, for European Application No. 19910476.1.
English translation of the Written Opinion of the International Searching Authority for International Application No. PCT/JP2019/051573, dated Mar. 4, 2021.

\* cited by examiner

ENVIRONMENT CONTROL SYSTEM, AND AIR CONDITIONER OR AIR CONDITIONING SYSTEM

TECHNICAL FIELD

The present disclosure relates to environment control systems, and air conditioners or air conditioning systems.

BACKGROUND ART

Electronic equipment controlled by an environment control system including a control unit and a plurality of devices connected to the control unit via a serial communication bus is known (see, for example, JP 2002-108637 A (Patent Literature 1)).

CITATIONS LIST

Patent Literature

Patent Literature 1: JP 2002-108637 A

SUMMARY OF INVENTION

Technical Problems

In the environment control system described above, if one of the devices malfunctions to fail to establish communications via the serial communication bus, the remaining normal devices also fall into communication failures. As a result, the control unit is incapable of controlling the electronic equipment.

An air conditioner or an air conditioning system including such an environment control system cannot continue an air conditioning operation if a malfunction occurs at any one of devices.

The present disclosure proposes an environment control system capable of identifying a failed one of devices connected to a control unit via a serial communication bus, and making the remaining normal devices usable, and also proposes an air conditioner or an air conditioning system including such an environment control system.

Solutions to Problems

The present disclosure provides an environment control system including:
a control unit;
a serial communication bus including
a main communication line having a first end connected to the control unit and
first to Nth (N: an integer of 2 or more) sub communication lines branched off from a second end of the main communication line;
devices connected to the first to Nth sub communication lines; and
switching units disposed on all the first to Nth sub communication lines or the sub communication lines excluding the first sub communication line and configured to connect and disconnect the devices to and from the control unit,
each of the first to Nth sub communication lines being connected to one or more of the devices.

The term "device" used herein refers to, for example, a sensor for detecting physical information, an actuator, or a device intended for environment control.

According to the present disclosure, if a malfunction occurs at one of the devices connected to the control unit via the serial communication bus, the control unit identifies the failed device by opening the switching units on the first to Nth sub communication lines in sequence, for example. The control unit opens the switching unit on the sub communication line to which the failed device is connected, thereby disconnecting the failed device therefrom. The control unit thus recovers the communications with the normal devices. As described above, disconnecting the failed device from the control unit makes the normal devices continuously usable.

In the environment control system according to an embodiment of the present disclosure,
when the control unit abnormally communicates with the devices, the control unit determines whether abnormal communications occur, by opening and closing the switching units.

According to the present disclosure, if the control unit abnormally communicates with all the devices, the control units opens and closes the switching units to determine which device malfunctions to cause the abnormal communication. The control unit thus identifies the failed device, and disconnects the failed device therefrom.

In the environment control system according to an embodiment of the present disclosure,
the switching units are disposed on all the first to Nth sub communication lines, and
when the control unit abnormally communicates with the devices, the control unit determines whether abnormal communications occur, by opening first, among the switching units on the first to Nth sub communication lines, a switching unit for a device that enables continuation of an environment controlling operation.

According to the present disclosure, when a device or devices that enable continuation of the environment controlling operation are normal, the environment control system continuously performs the environment controlling operation using at least the normal devices.

In the environment control system according to an embodiment of the present disclosure,
the switching units are disposed on all the first to Nth sub communication lines, and
when the control unit abnormally communicates with the devices, the control unit opens the switching units on the first to Nth sub communication lines one by one in sequence, and determines, when the control unit normally communicates with the devices connected to the sub communication lines on which the closed switching units are disposed, that a malfunction occurs at a device connected to the sub communication line on which the opened switching unit is disposed.

According to the present disclosure, the control unit accurately identifies a failed one of the devices connected to the first to Nth sub communication lines.

In the environment control system according to an embodiment of the present disclosure,
the switching units are disposed on the sub communication lines excluding the first sub communication line,
when the control unit abnormally communicates with the devices, the control unit opens the switching units, and determines, when the control unit abnormally communicates with a device or devices connected to the first sub communication line, that a malfunction occurs at the device or devices connected to the first sub communication line, and
when the control unit abnormally communicates with the devices, the control unit opens the switching units, and if the control unit normally communicates with the device or devices connected to the first sub communication line, the control unit closes the switching units one by one in sequence, and when the control unit abnormally communicates with a device or devices connected to a sub communication line which the switching unit is closed, the control unit determines that a malfunction occurs at the device or devices connected to the sub communication line with the closed switching unit.

According to the present disclosure, the control unit accurately identifies a failed one of the devices connected to the first to Nth sub communication lines.

The present disclosure also provides an air conditioner or an air conditioning system including the environment control system described above.

According to the present disclosure, the air conditioner or the air conditioning system is capable of identifying a failed one of the devices connected to the control unit via the serial communication bus, and disconnecting the failed device from the control unit, thereby making the remaining normal devices usable.

DESCRIPTION OF EMBODIMENTS

Figure 1:
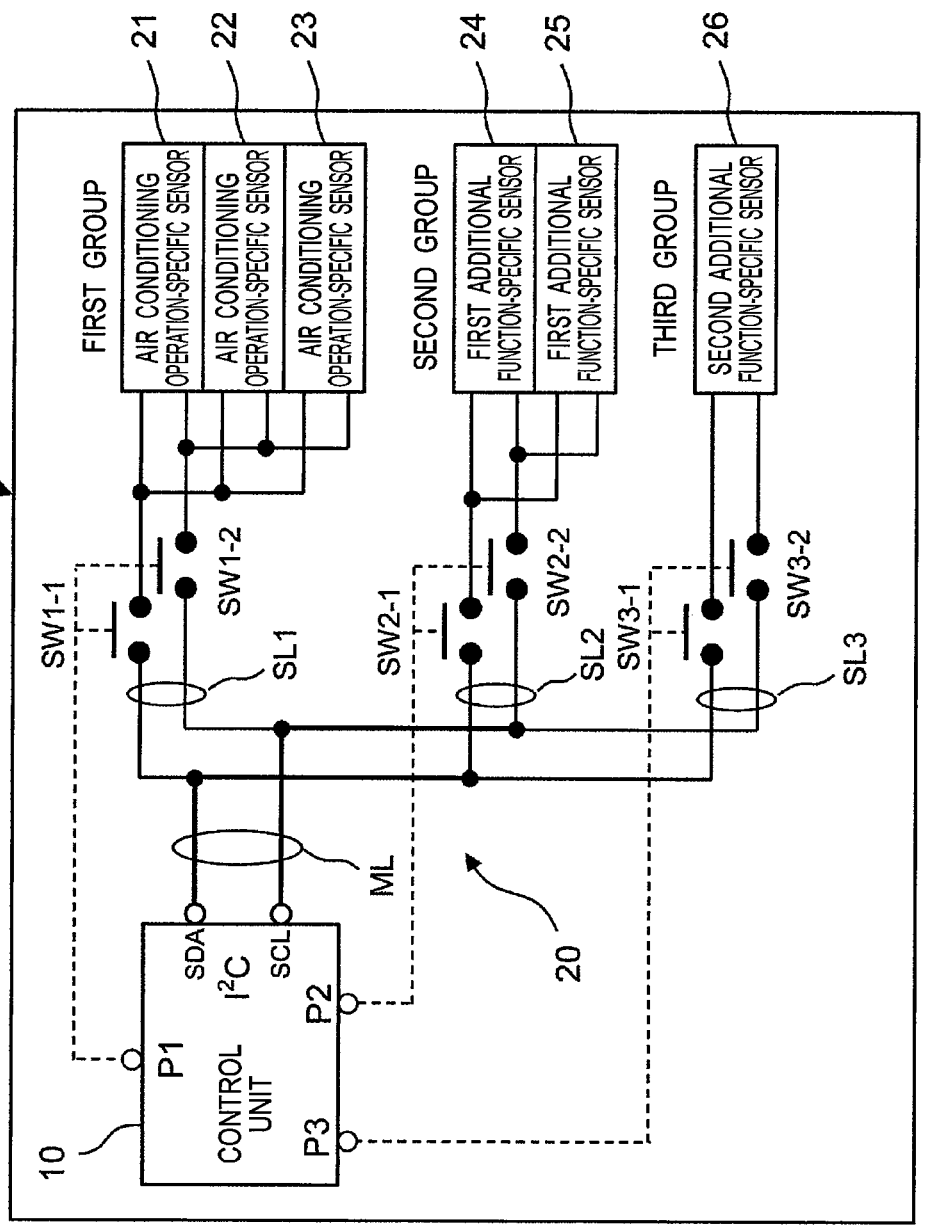
FIG. 1 is a configuration diagram of an air conditioner according to a first embodiment of the present disclosure.

Embodiments will be described below. In the drawings, identical reference signs indicate identical or corresponding portions.

First Embodiment

FIG. 1 is a configuration diagram of an air conditioner 1 according to a first embodiment of the present disclosure.

As illustrated in FIG. 1, the air conditioner 1 according to the first embodiment includes: a control unit 10 configured to control an air conditioning operation; a serial communication bus 20 including a main communication line ML having a first end connected to the control unit 10 and first to third sub communication lines SL1 to SL3 branched off from a second end of the main communication line ML; air conditioning operation-specific sensors 21 to 23 (devices) connected to the first sub communication line SL1; first additional function-specific sensors 24 and 25 (devices) connected to the second sub communication line SL2; a second additional function-specific sensor 26 (a device) connected to the third sub communication line SL3; switches SW1-1 and SW1-2 disposed on the first sub communication line SL1 and configured to connect and disconnect the air conditioning operation-specific sensors 21 to 23 to and from the control unit 10; switches SW2-1 and SW2-2 disposed on the second sub communication line SL2 and configured to connect and disconnect the first additional function-specific sensors 24 and 25 to and from the control unit 10; and switches SW3-1 and SW3-2 disposed on the third sub communication line SL3 and configured to connect and disconnect the second additional function-specific sensor 26 to and from the control unit 10. The number of devices connected to each of the first to third sub communication lines SL1 to SL3 is one or more. The switches SW1-1 and SW1-2 serve as a first switching unit. The switches SW2-1 and SW2-2 serve as a second switching unit. The switches SW3-1 and SW3-2 serve as a third switching unit. In the first embodiment, the first to third sub communication lines SL1 to SL3 are respectively provided with the first to third switching units (SW1-1, SW1-2; SW2-1, SW2-2; SW3-1, SW3-2).

The control unit 10, the serial communication bus 20, the air conditioning operation-specific sensors 21 to 23 (devices), the first additional function-specific sensors 24 and 25 (devices), the second additional function-specific sensor 26 (a device), the switches SW1-1 and SW1-2, the switches SW2-1 and SW2-2, and the switches SW3-1 and SW3-2 constitute an environment control system.

Examples of the devices connected to the first to third sub communication lines SL1 to SL3 may include, but not limited to, a sensor for detecting physical information, an actuator, and a device intended for environment control.

The control unit 10 includes a microcomputer, an input and output circuit, and the like. The control unit 10 has an SDA terminal to which a serial data line of the serial communication bus 20 is connected, and an SCL terminal to which a serial clock line of the serial communication bus 20 is connected. The control unit 10 also has an output terminal P1 from which a control signal is output for turning on or off the switches SW1-1 and SW1-2, an output terminal P2 from which a control signal is output for turning on or off the switches SW2-1 and SW2-2, and an output terminal P3 from which a control signal is output for turning on or off the switches SW3-1 and SW3-2.

The control unit 10 communicates with the air conditioning operation-specific sensors 21 to 23, the first additional function-specific sensors 24 and 25, and the second additional function-specific sensor 26 via the serial communication bus 20, using the I²C (Inter-Integrated Circuit) protocol. It should be noted that any serial communication protocol may be employed in addition to the I²C protocol.

It is assumed herein that the air conditioning operation-specific sensors 21 to 23 belong to a first group, the first additional function-specific sensors 24 and 25 belong to a second group, and the second additional function-specific sensor 26 belongs to a third group. Examples of the air conditioning operation-specific sensors 21 to 23 in the first group may include, but not limited to, a temperature sensor, a humidity sensor, a floor-temperature sensor, and a wall-temperature sensor. Examples of the first additional function-specific sensors 24 and 25 in the second group may include, but not limited to, a temperature sensor for detecting a temperature inside a humidifying duct in a case where the air conditioner 1 includes a humidifying unit, a humidity sensor for detecting a humidity inside the humidifying duct in the same case, and a voice processing device. Examples of the second additional function-specific sensor 26 in the third group may include, but not limited to, a $CO_2$ sensor for use in control of a ventilating operation as a new additional function.

The control unit 10 performs processing for, for example, a cooling operation or a heating operation, based on signals from the air conditioning operation-specific sensors 21 to 23. In the processing for, for example, the cooling operation or the heating operation, the control unit 10 turns on all the switches SW1-1, SW1-2, SW2-1, SW2-2, SW3-1, and SW3-2, so that the air conditioning operation-specific sensors 21 to 23, the first additional function-specific sensors 24 and 25, and the second additional function-specific sensor 26 are connected to the control unit 10 via the serial communication bus 20.

Next, a description will be given of abnormal communication determination processing by the control unit 10 in accordance with a flowchart of FIG. 2.

Figure 2:
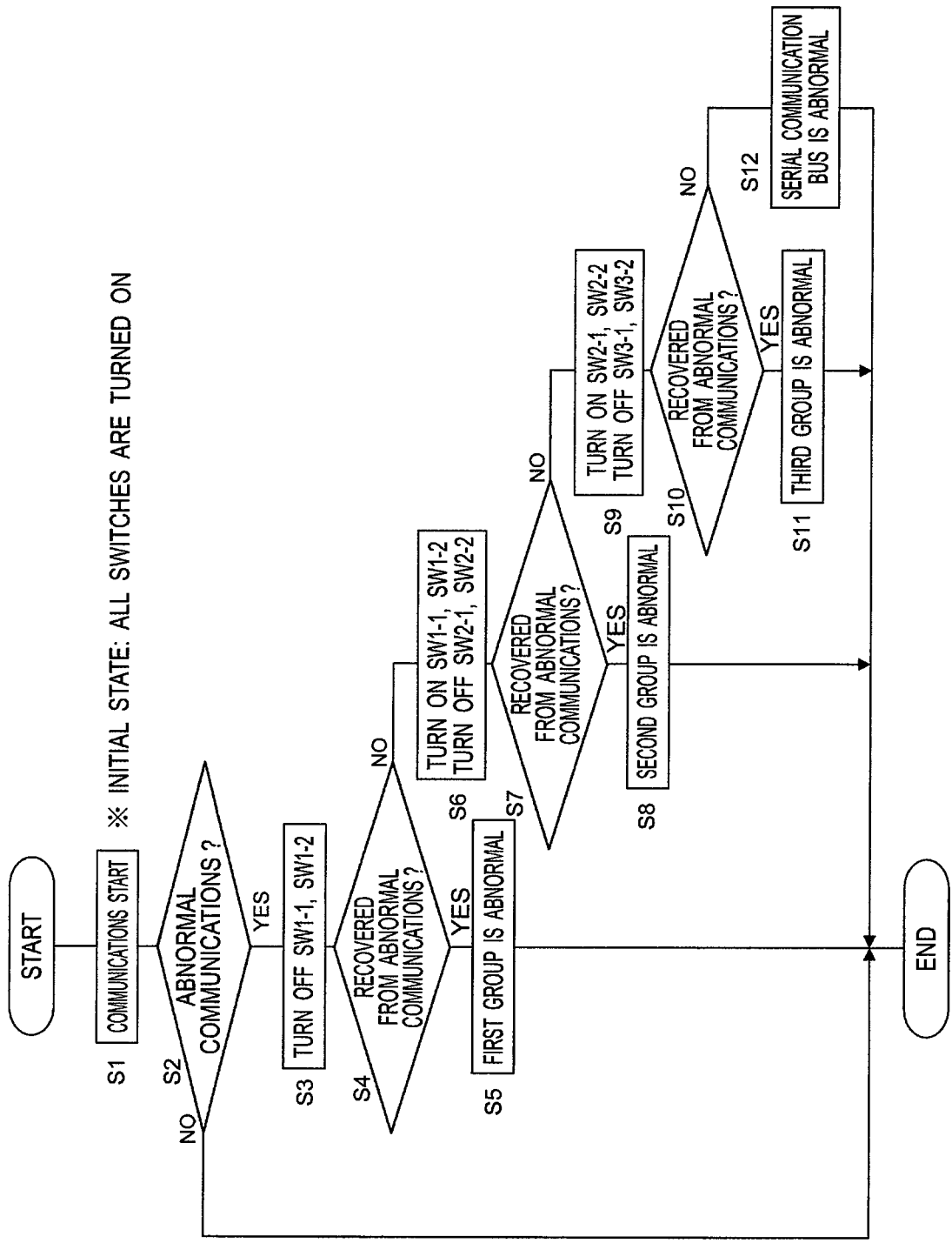
FIG. 2 is a flowchart of abnormal communication determination processing by a control unit of the air conditioner according to the first embodiment.

As illustrated in FIG. 2, when the abnormal communication determination processing starts, in step S1, the control unit 10 starts to communicate with the air conditioning operation-specific sensors 21 to 23, the first additional function-specific sensors 24 and 25, and the second additional function-specific sensor 26.

Next, in step S2, the control unit 10 determines whether the communications are abnormal. When the communications are abnormal, the processing proceeds to step S3. When the communications are not abnormal, i.e., are normal, the processing ends.

In step S3, the control unit 10 turns off the switches SW1-1 and SW1-2 (the switches SW2-1, SW2-2, SW3-1, and SW3-2 remain in an on state). Only the air conditioning operation-specific sensors 21 to 23 in the first group are thus disconnected from the control unit 10.

Next, in step S4, when the control unit 10 determines that it has recovered from abnormal communications, the processing proceeds to step S5. In step S4, when the control unit 10 determines that it has not recovered from the abnormal communications, the processing proceeds to step S6.

In step S5, the control unit 10 determines that the first group is abnormal. The processing then ends. In this case, a malfunction occurs at at least one of the air conditioning operation-specific sensors 21 to 23 in the first group.

In step S6, the control unit 10 turns on the switches SW1-1 and SW1-2, and turns off the switches SW2-1 and SW2-2 (the switches SW3-1 and SW3-2 remain in an on state). Only the first additional function-specific sensors 24 and 25 in the second group are thus disconnected from the control unit 10.

Next, in step S7, when the control unit 10 determines that it has recovered from abnormal communications, the processing proceeds to step S8. In step S7, when the control unit 10 determines that it has not recovered from the abnormal communications, the processing proceeds to step S9.

In step S8, the control unit 10 determines that the second group is abnormal. The processing then ends. In this case, a malfunction occurs at at least one of the first additional function-specific sensors 24 and 25 in the second group.

In step S9, the control unit 10 turns on the switches SW2-1 and SW2-2, and turns off the switches SW3-1 and SW3-2 (the switches SW1-1 and SW1-2 remain in an on state). Only the second additional function-specific sensor 26 in the third group is thus disconnected from the control unit 10.

Next, in step S10, when the control unit 10 determines that it has recovered from abnormal communications, the processing proceeds to step S11. In step S11, the control unit 10 determines that the third group is abnormal. The processing then ends. In this case, a malfunction occurs at the second additional function-specific sensor 26 in the third group.

In step S10, when the control unit 10 determines that it has not recovered from the abnormal communications, the processing proceeds to step S12. In step S12, the control unit 10 determines that the serial communication bus 20 is abnormal. The processing then ends. The control unit 10 determines that the serial communication bus 20 is abnormal, because of, for example, a malfunction at a communication circuit of the control unit 10 and a malfunction, such as a break or a short circuit, of the serial communication bus 20 itself.

Figure 3:
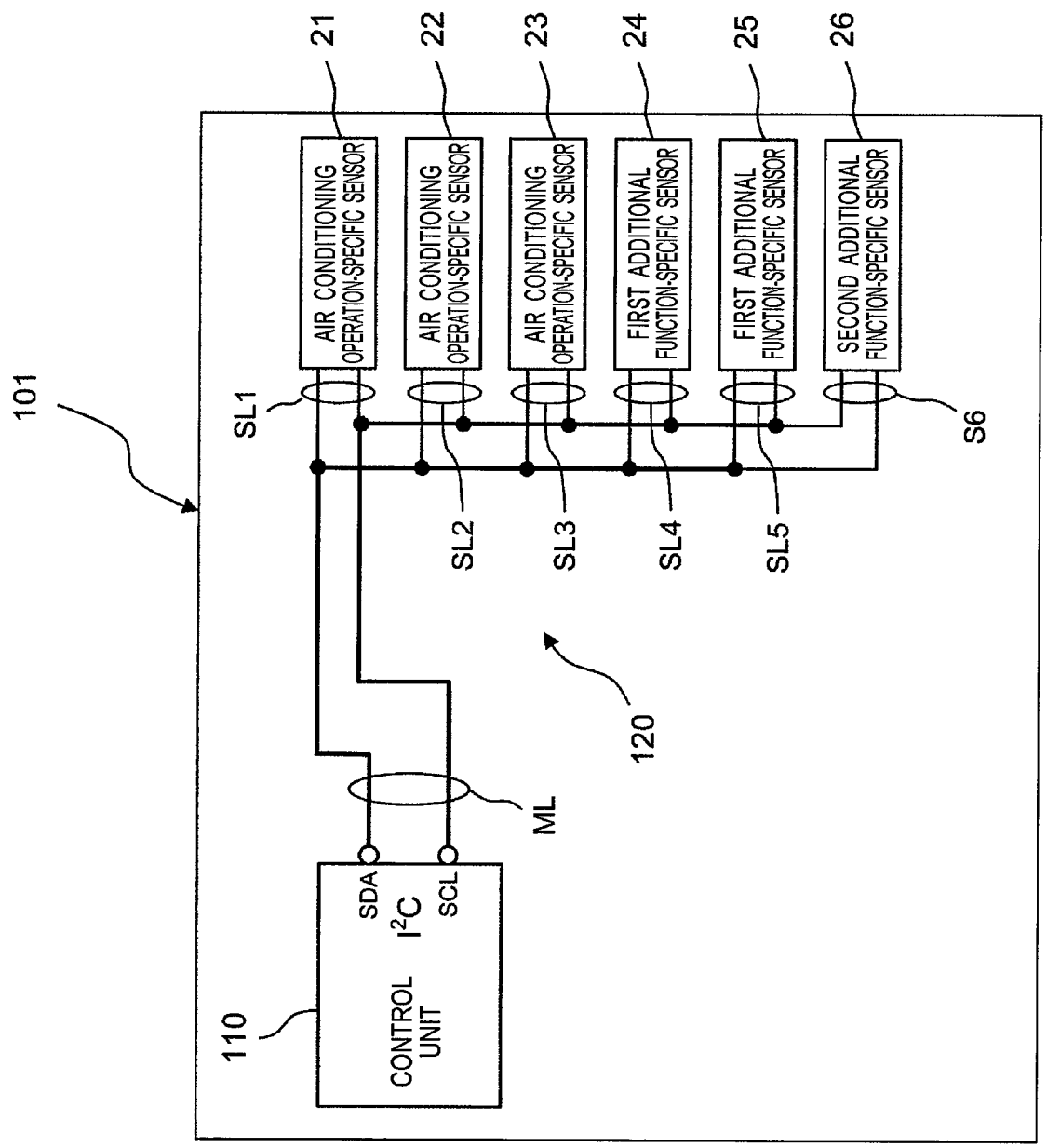
FIG. 3 is a configuration diagram of an air conditioner according to a comparative example.

FIG. 3 is a configuration diagram of an air conditioner according to a comparative example. The comparative example is merely illustrative for understanding the present invention with ease, and is not intended to limit the present invention.

As illustrated in FIG. 3, an air conditioner 101 according to the comparative example includes: a control unit 110 configured to control an air conditioning operation; a serial communication bus 120 including a main communication line ML having a first end connected to the control unit 110 and a plurality of sub communication lines SL1 to SL6 branched off from a second end of the main communication line ML; an air conditioning operation-specific sensor 21 connected to the sub communication line SL1; an air conditioning operation-specific sensor 22 connected to the sub communication line SL2; an air conditioning operation-specific sensor 23 connected to the sub communication line SL3; a first additional function-specific sensor 24 connected to the sub communication line SL4; a first additional function-specific sensor 25 connected to the sub communication line SL5; and a second additional function-specific sensor 26 connected to the sub communication line SL6.

The control unit 110 includes a microcomputer, an input and output circuit, and the like. The control unit 110 has an SDA terminal to which a serial data line of the serial communication bus 120 is connected, and an SCL terminal to which a serial clock line of the serial communication bus 120 is connected.

The control unit 110 communicates with the air conditioning operation-specific sensors 21 to 23, the first additional function-specific sensors 24 and 25, and the second additional function-specific sensor 26 via the serial communication bus 120, using the I²C (Inter-Integrated Circuit) protocol.

In the air conditioner 101 according to the comparative example, if one sensor among the air conditioning operation-specific sensors 21 to 23, the first additional function-specific sensors 24 and 25, and the second additional function-specific sensor 26 malfunctions to fail to establish communications via the serial communication bus 120, the remaining normal sensors fall into communication failures. As a result, the control unit 110 is incapable of controlling the air conditioner 101. Consequently, the air conditioner 101 according to the comparative example fails to continue the air conditioning operation.

The communication failures of the air conditioning operation-specific sensors 21 to 23, the first additional function-specific sensors 24 and 25, and the second additional function-specific sensor 26 may occur because at least one of the serial data line or the serial clock line of the serial communication bus 120 is placed in a short circuit mode.

In contrast to this, the air conditioner 1 according to the first embodiment identifies a failed sensor among the air conditioning operation-specific sensors 21 to 23, the first additional function-specific sensors 24 and 25, and the second additional function-specific sensor 26 connected to the control unit 10 via the serial communication bus 20, and makes the remaining normal sensors usable.

In the air conditioner 1 having the configuration described above, if a malfunction occurs at one of the devices (the air conditioning operation-specific sensors 21 to 23, the first additional function-specific sensors 24 and 25, the second additional function-specific sensor 26) connected to the control unit 10 via the serial communication bus 20, the control unit 10 identifies the failed device by opening the first switching unit (the switches SW1-1 and SW1-2), the second switching unit (the switches SW2-1 and SW2-2), and the third switching unit (the switches SW3-1 and SW3-2) respectively disposed on the first to third sub communication lines SL1 to SL3, in sequence.

For example, if the control unit 10 fails to communicate with all the devices because of a malfunction at the first additional function-specific sensor 24, the control unit 10 opens the switches SW2-1 and SW2-2 on the second sub communication line SL2 to which the failed first additional function-specific sensor 24 is connected, thereby disconnecting the failed first additional function-specific sensor 24 and the first additional function-specific sensor 25 therefrom. The control unit 10 thus recovers the communications with the normal air conditioning operation-specific sensors 21 to 23 and the communication with the normal second additional function-specific sensor 26.

As described above, disconnecting the failed device from the control unit 10 makes the normal devices continuously usable.

If the control unit 10 abnormally communicates with all the devices, the control units 10 opens and closes the first switching unit (the switches SW1-1 and SW1-2), the second switching unit (the switches SW2-1 and SW2-2), and the third switching unit (the switches SW3-1 and SW3-2) to determine which device malfunctions to cause abnormal communication. The control unit 10 thus identifies the failed device, and disconnects the failed device therefrom.

If the control unit 10 abnormally communicates with all the devices, the control unit 10 determines whether the communications are abnormal, by opening first the switches SW1-1 and SW1-2 for the devices (the air conditioning operation-specific sensors 21 to 23) that enable continuation of the environment controlling operation, among the switches SW1-1 and SW1-2, the switches SW2-1 and SW2-2, and the switches SW3-1 and SW3-2. With this configuration, when the devices (the air conditioning operation-specific sensors 21 to 23) that enable continuation of the air conditioning operation are normal, the air conditioner 1 continues the air conditioning operation using the devices (the air conditioning operation-specific sensors 21 to 23).

If the control unit 10 abnormally communicates with all the devices, the control unit 10 opens the first switching unit (the switches SW1-1 and SW1-2), the second switching unit (the switches SW2-1 and SW2-2), and the third switching unit (the switches SW3-1 and SW3-2) respectively disposed on the first to third sub communication lines SL1 to SL3, one by one in sequence. When the control unit 10 normally communicates with the devices connected to two of the sub communication lines SL1 to SL3 on which the closed switching units are disposed, then the control unit 10 determines that a malfunction or failure occurs at the device connected to the sub communication line on which the opened switching unit is disposed. With this configuration, the control unit 10 accurately identifies a failed one of the devices connected to the first to third sub communication lines SL1 to SL3.

The air conditioner 1 thus embodied is capable of identifying a failed one of the devices connected to the control unit 10 via the serial communication bus 20, and disconnecting the failed device from the control unit 10, thereby making the remaining normal devices usable.

The first embodiment concerns the air conditioner 1 including the environment control system. Alternatively, the present disclosure may be applied to an air conditioning system including external devices, such as a sensor and an actuator, connected to the air conditioner 1 via a serial communication bus.

In the first embodiment, the number of devices connected to each of the first sub communication line SL1 and the second sub communication line SL2 is two or more. Alternatively, the number of devices connected to each of the first to third sub communication lines SL1 to SL3 may be one.

In the first embodiment, the environment control system includes the first to third sub communication lines SL1 to SL3. However, the number of sub communication lines is not limited to three. For example, the present invention may be applied to an environment control system including first to Nth (N: an integer of 2 or more) sub communication lines SL1 to SL3.

Second Embodiment

Figure 4:
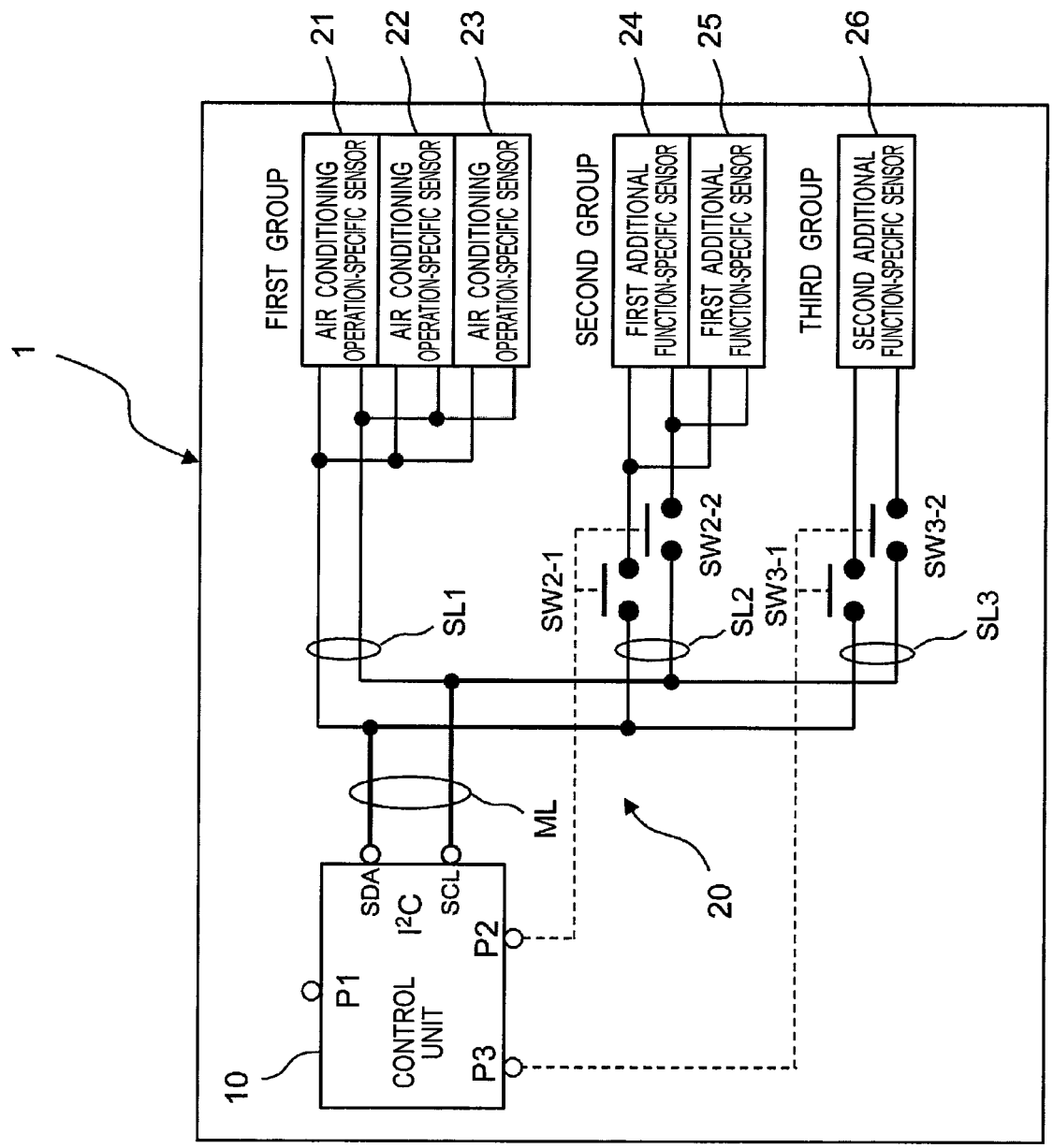
FIG. 4 is a configuration diagram of an air conditioner according to a second embodiment of the present disclosure.

FIG. 4 is a configuration diagram of an air conditioner 1 according to a second embodiment of the present disclosure. The air conditioner 1 according to the second embodiment is identical in configuration to the air conditioner 1 according to the first embodiment except that the air conditioner 1 according to the second embodiment does not include the switches SW1-1 and SW1-2 described in the first embodiment, and a control unit 10 in the second embodiment is different in operation from that in the first embodiment.

In the air conditioner 1 according to the second embodiment, the control unit 10, a serial communication bus 20, air conditioning operation-specific sensors 21 to 23 (devices), first additional function-specific sensors 24 and 25 (devices), a second additional function-specific sensor 26 (a device), switches SW2-1 and SW2-2, and switches SW3-1 and SW3-2 constitute an environment control system.

The control unit 10 performs processing for, for example, a cooling operation or a heating operation, based on signals from the air conditioning operation-specific sensors 21 to 23. In the processing for, for example, the cooling operation or the heating operation, the control unit 10 turns on all the switches SW2-1, SW2-2, SW3-1, and SW3-2, so that the air conditioning operation-specific sensors 21 to 23, the first additional function-specific sensors 24 and 25, and the second additional function-specific sensor 26 are connected to the control unit 10 via the serial communication bus 20.

Next, a description will be given of abnormal communication determination processing by the control unit 10 in accordance with a flowchart of FIG. 5.

Figure 5:
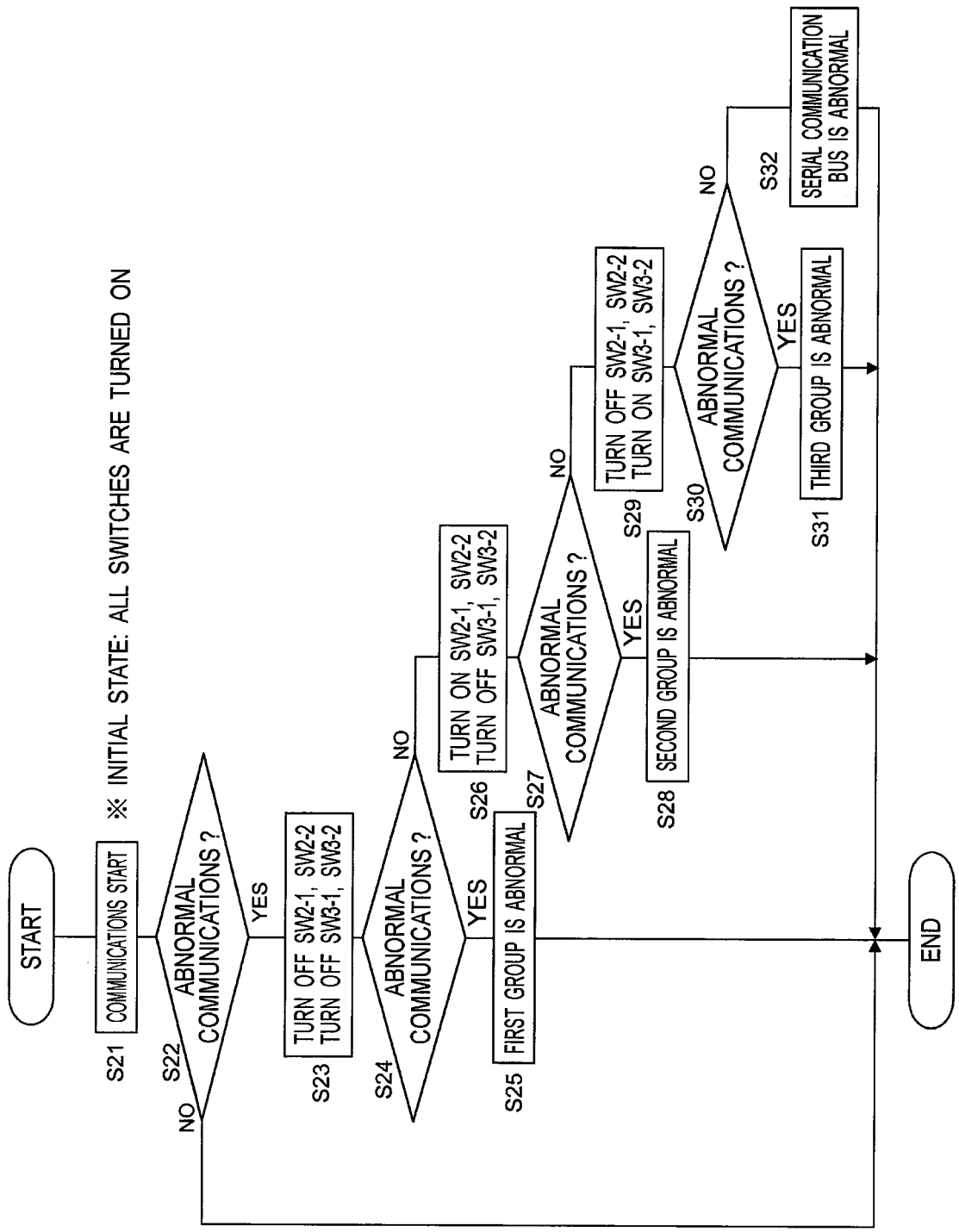
FIG. 5 is a flowchart of abnormal communication determination processing by a control unit of the air conditioner according to the second embodiment.

As illustrated in FIG. 5, when the abnormal communication determination processing starts, in step S21, the control unit 10 starts to communicate with the air conditioning operation-specific sensors 21 to 23, the first additional function-specific sensors 24 and 25, and the second additional function-specific sensor 26.

Next, in step S22, the control unit 10 determines whether the communications are abnormal. When the communications are abnormal, the processing proceeds to step S23. When the communications are normal, the processing ends.

In step S23, the control unit 10 turns off the switches SW2-1, SW2-2, SW3-1, and SW3-2. Only the air conditioning operation-specific sensors 21 to 23 in a first group are thus connected to the control unit 10.

Next, in step S24, when the control unit 10 determines that the communications are abnormal, the processing proceeds to step S25. In step S24, when the control unit 10 determines that the communications are normal, the processing proceeds to step S26.

In step S25, the control unit 10 determines that the first group is abnormal. The processing then ends. In this case, a malfunction may occur at at least one of the air conditioning operation-specific sensors 21 to 23 in the first group.

In step S26, the control unit 10 turns on the switches SW2-1 and SW2-2, and turns off the switches SW3-1 and SW3-2. The air conditioning operation-specific sensors 21 to 23 in the first group, which normally communicate with the control unit 10, and the first additional function-specific sensors 24 and 25 in a second group are thus connected to the control unit 10.

Next, in step S27, when the control unit 10 determines that the communications are abnormal, the processing proceeds to step S28. In step S27, when the control unit 10 determines that the communications are normal, the processing proceeds to step S29.

In step S28, the control unit 10 determines that the second group is abnormal. The processing then ends. In this case, a malfunction may occur at at least one of the first additional function-specific sensors 24 and 25 in the second group.

In step S29, the control unit 10 turns off the switches SW2-1 and SW2-2, and turns on the switches SW3-1 and SW3-2. The air conditioning operation-specific sensors 21 to 23 in the first group, which normally communicate with the control unit 10, and the second additional function-specific sensor 26 in a third group are thus connected to the control unit 10.

Next, in step S30, when the control unit 10 determines the communications are abnormal, the processing proceeds to step S31. In step S31, the control unit 10 determines that the third group is abnormal. The processing then ends. In this case, a malfunction may occur at the second additional function-specific sensor 26 in the third group.

In step S30, when the control unit 10 determines that the communications are normal, the processing proceeds to step S32. In step S32, the control unit 10 determines that the serial communication bus 20 is abnormal. The processing then ends. The serial communication bus 20 may become abnormal, because of, for example, a malfunction at a communication circuit of the control unit 10 and a malfunction, such as a break or a short circuit, of the serial communication bus 20 itself.

As in the air conditioner 1 according to the first embodiment, the air conditioner 1 according to the second embodiment is capable of identifying a failed one of the devices connected to the control unit via the serial communication bus, and making the remaining normal devices usable.

Third Embodiment

A third embodiment of the present disclosure is directed to an underfloor heating system. The underfloor heating system may employ hot water as a heat source or may employ an electric heater as a heat source.

The underfloor heating system according to the third embodiment includes an environment control system similar in configuration to the environment control system according to the first embodiment except the air conditioning operation-specific sensors 21 to 23 (the devices), the first additional function-specific sensors 24 and 25 (the devices), and the second additional function-specific sensor 26 (the device).

The underfloor heating system includes a plurality of devices such as an underfloor heating-specific sensor and an indoor temperature sensor.

As in the air conditioner 1 according to the first embodiment, the underfloor heating system having the configuration described above is capable of identifying a failed one of the devices connected to a control unit via a serial communication bus, and making the remaining normal devices usable.

Fourth Embodiment

A fourth embodiment of the present disclosure is directed to a hot-water heating system.

The hot-water heating system according to the fourth embodiment includes an environment control system similar in configuration to the environment control system according to the first embodiment except the air conditioning operation-specific sensors 21 to 23 (the devices), the first additional function-specific sensors 24 and 25 (the devices), and the second additional function-specific sensor 26 (the device).

The hot-water heating system includes a plurality of devices such as a hot-water heating-specific sensor.

As in the air conditioner 1 according to the first embodiment, the hot-water heating system having the configuration described above is capable of identifying a failed one of the devices connected to a control unit via a serial communication bus, and making the remaining normal devices usable.

The first to fourth embodiments describe the air conditioner 1, underfloor heating system, and hot-water heating system each including the environment control system. However, an environment control system is not limited thereto. The present invention may be applied to another system for controlling an environment.

The foregoing description concerns specific embodiments of the present disclosure; however, the present disclosure is not limited to the first to fourth embodiments, and various modifications and variations may be made within the scope of the present disclosure.

REFERENCE SIGNS LIST 1 air conditioner
10 control unit
20 serial communication bus
21 to 23 air conditioning operation-specific sensor (device)
24, 25 first additional function-specific sensor (device)
26 second additional function-specific sensor (device)
ML main communication line
SL1 to SL3 first to third sub communication lines
SW1-1, SW1-2, SW2-1, SW2-2, SW3-1, SW3-2 switch (switching unit)

The invention claimed is:

1. An environment control system comprising:
a control unit;
a serial communication bus including
a main communication line having a first end connected to the control unit, and
first to Nth (N: an integer of 2 or more) sub communication lines branched off from a second end of the main communication line;
devices connected to the first to Nth sub communication lines; and
switching units disposed on the sub communication lines excluding the first sub communication line, and configured to connect and disconnect the devices to and from the control unit, each of the first to Nth sub communication lines being connected to one or more of the devices, wherein when the control unit closes the switching units one by one in sequence and normally communicates with the devices connected to the sub communication lines excluding the first sub communication lines, the control unit determines that the serial communication bus is abnormal.

2. The environment control system according to claim 1, wherein when the control unit abnormally communicates with the devices, the control unit determines whether abnormal communications occur, by opening and closing the switching units.

3. The environment control system according to claim 1, wherein when the control unit abnormally communicates with the devices, the control unit opens the switching units, and determines, when the control unit abnormally communicates with a device or devices connected to the first sub communication line, that a malfunction occurs at the device or devices connected to the first sub communication line, and when the control unit abnormally communicates with the devices, the control unit opens the switching units, and if the control unit normally communicates with the device or devices connected to the first sub communication line, the control unit closes the switching units one by one in sequence, and when the control unit abnormally communicates with a device or devices connected to a sub communication line for which the switching unit is closed, the control unit determines that a malfunction occurs at the device or devices.

4. An air conditioner or an air conditioning system comprising:

the environment control system according to claim 1.

5. The environment control system according to claim 1, wherein the control unit communicates with the devices via the serial communication bus, using I²C (Inter-Integrated Circuit) protocol.

6. The environment control system according to claim 1, wherein the environment control system is mounted in an air conditioner.

7. The environment control system according to claim 1, wherein the controller includes output terminals from each of which a control signal is output to the respective switching units to turn on or off the respective switching units.

* * * * *